United States Patent
Luo

(10) Patent No.: US 6,749,321 B2
(45) Date of Patent: Jun. 15, 2004

(54) AUTOMATIC POWER-GENERATING DEVICE FOR DECORATIVE LAMPS

(75) Inventor: Yih-Wenn Luo, 12F-4, No. 388, Jiun Ping Rd., An Ping Dist., Tainan City (TW)

(73) Assignees: Yueh-Ying Pan; Yih-Wenn Luo, Tainan (TW)

( * ) Notice: Subject to any disclaimer, the term of this patent is extended or adjusted under 35 U.S.C. 154(b) by 0 days.

(21) Appl. No.: 10/229,658

(22) Filed: Aug. 28, 2002

(65) Prior Publication Data

US 2004/0042206 A1 Mar. 4, 2004

(51) Int. Cl.[7] ................................. F21L 13/00
(52) U.S. Cl. ................... 362/192; 362/500; 362/473
(58) Field of Search .......................... 362/192, 500, 362/473

(56) References Cited

U.S. PATENT DOCUMENTS

| | | | | |
|---|---|---|---|---|
| 4,725,928 A | * | 2/1988 | Strepek | 362/78 |
| 4,775,919 A | * | 10/1988 | Pearsall et al. | 362/78 |
| 4,782,431 A | * | 11/1988 | Park | 362/161 |
| 4,782,731 A | * | 11/1988 | Huntington | 362/61 |
| 5,580,093 A | * | 12/1996 | Conway | 280/816 |
| 5,810,450 A | * | 9/1998 | Tsu et al. | 301/5.3 |
| 6,116,763 A | * | 9/2000 | King | 362/500 |
| 6,382,820 B1 | * | 5/2002 | Chung | 362/500 |
| 6,398,395 B1 | * | 6/2002 | Hyun | 362/500 |
| 6,474,832 B2 | * | 11/2002 | Murray | 362/192 |
| 6,619,823 B2 | * | 9/2003 | Dai | 362/500 |

* cited by examiner

Primary Examiner—Sandra O'Shea
Assistant Examiner—Jacob Y. Choi
(74) Attorney, Agent, or Firm—Alan D. Kamrath; Nikolai & Mersereau, P.A.

(57) ABSTRACT

An automatic power-generating device for decorative lamps has a weight-distributing plate or a heavy weight inside. Rotation of an exterior object produces an eccentric force (a centrifugal force) to rotate the weight-distributing plate or the heavy weight together with a coil and a magnet. The coil and the magnet rotate at different speeds due to the law of inertia to force magnetic field produced vicissitudes and to generate an inductive current (based on a principle of electromagnetic induction) to supply decorative lamps with power for lighting. Thus, the automatic power-generating device is able to save electricity and is convenient to be installed.

19 Claims, 6 Drawing Sheets

AUTOMATIC POWER-GENERATING DEVICE FOR DECORATIVE LAMPS

BACKGROUND OF THE INVENTION

This invention relates to an automatic power-generating device for decorative lamps, particularly to one in which a weight-distributing plate or a heavy weight is actuated by rotation of an exterior object to produce an eccentric force (a centrifugal force) and rotates together with a magnet to force magnetic field produced vicissitudes and to generate an inductive current (based on a principle of electromagnetic induction) to supply decorative lamps with power for lighting, and which is able to save electricity and is convenient to be installed.

Conventionally, a power-generating device is powered by a battery or a generator and connected with a decorative lamp by an electric wire to light up the decorative lamp.

Based on the aforesaid principle that the stator and the rotor interact to make up an electromotive force and produce electrical energy, this structure, is able to save electricity, is convenient in use and is impossible to be damaged.

SUMMARY OF THE INVENTION

This invention is devised to offer an automatic power-generating device for decorative lamps. A weight-distributing plate or a heavy weight is actuated by the rotation of an exterior object to produce an eccentric force (centrifugal force) and rotates together with a coil and a magnet. The coil and magnet rotate at different speeds due to the law of inertia to force magnetic field produced vicissitudes and to generate an inductive current (based on a principle of electromagnetic induction) to supply decorative lamps with power for lighting. Thus, the automatic power-generating device is able to save electricity and is convenient to be installed.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
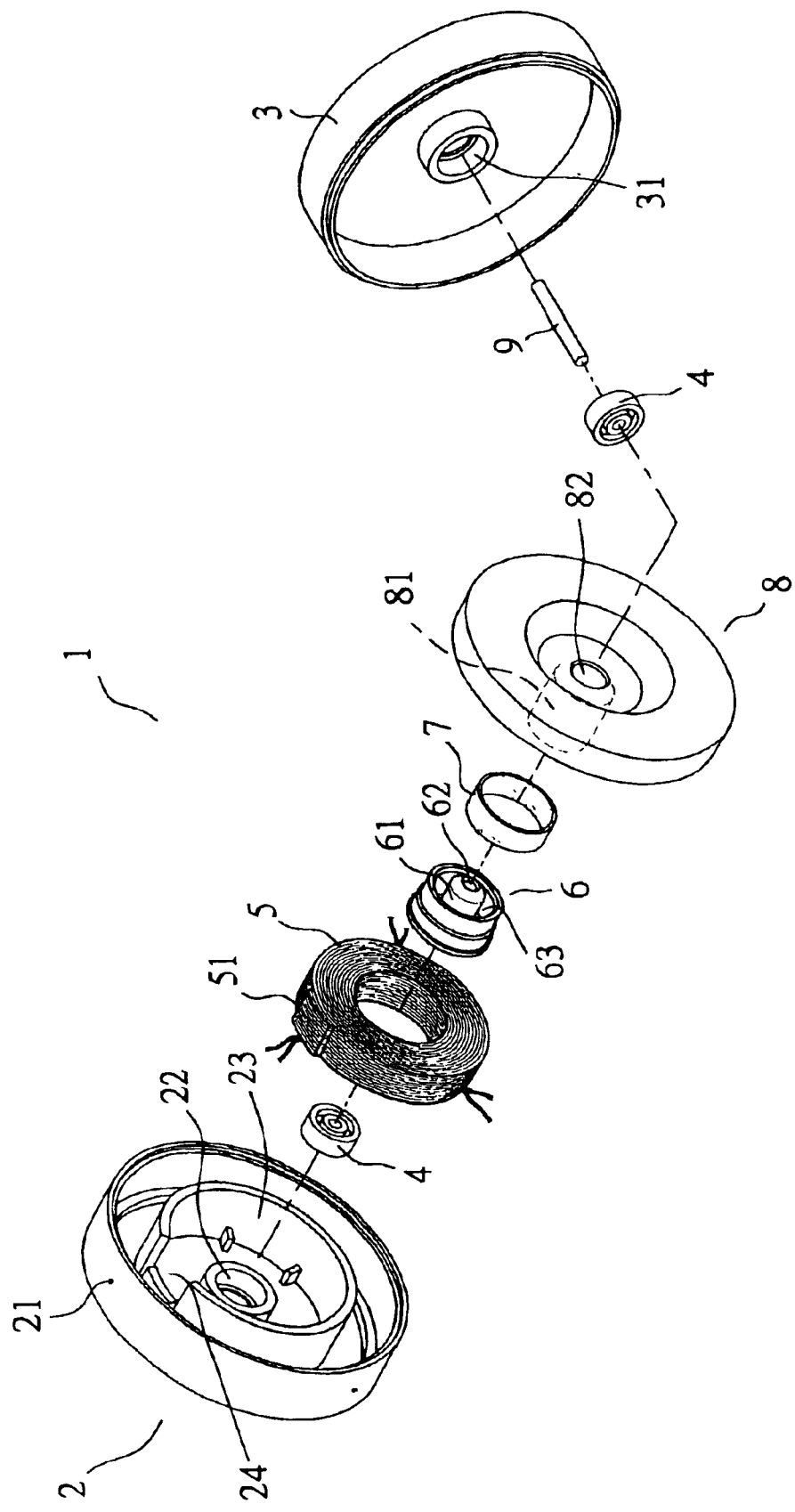
FIG. 1 is an exploded perspective view of a first embodiment of an automatic power-generating device for decorative lamps in the present invention.
Figure 2:
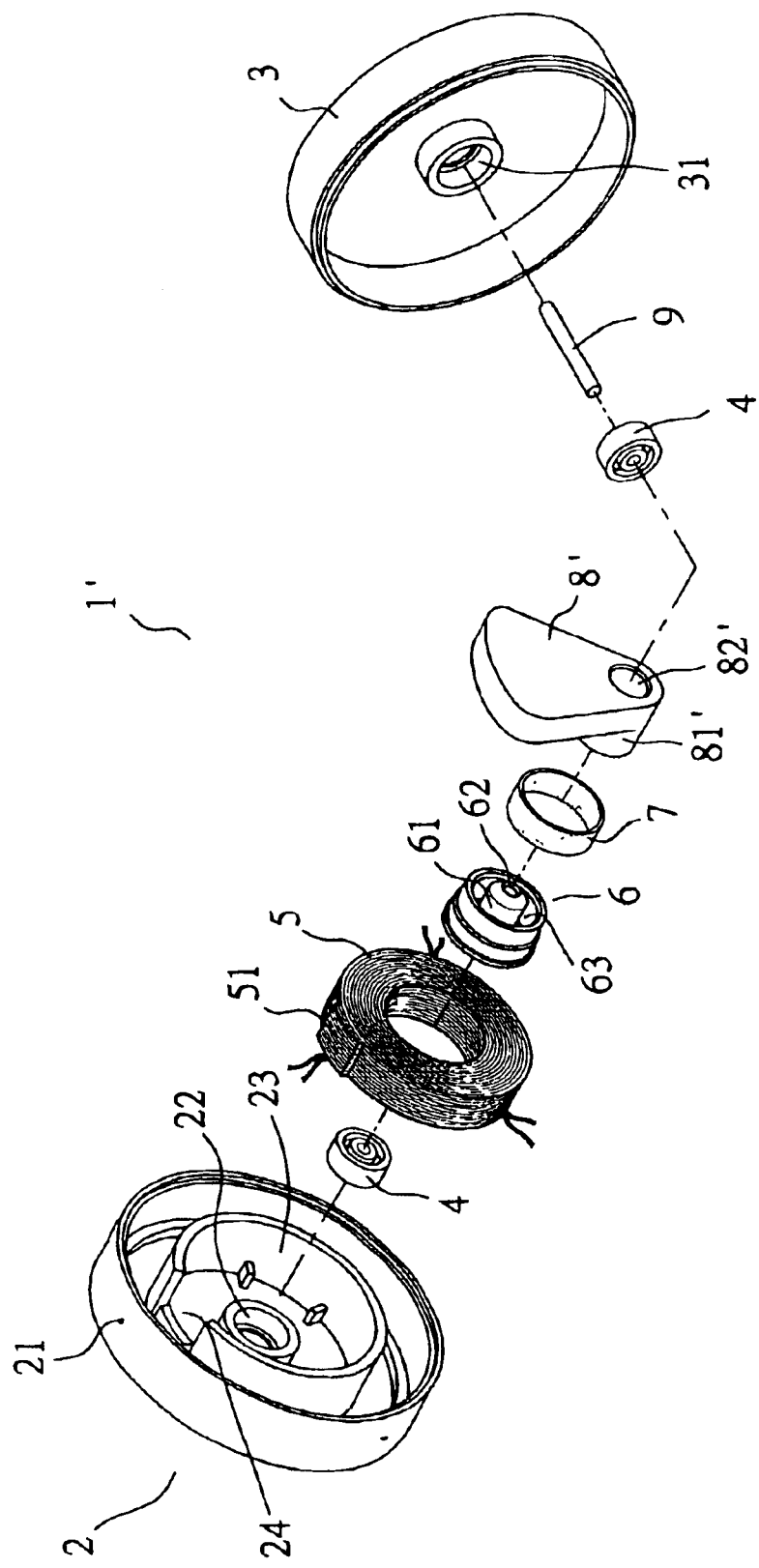
FIG. 2 is an exploded perspective view of a second embodiment of the automatic power-generating device for decorative lamps in the present invention.

A first and a second preferred embodiment of an automatic power-generating device 1, 1' for decorative lamps in the present invention, as shown in FIGS. 1 and 2, includes a left cover 2, a bearing 4, an annular coil 5, a magnet holder 6, a permanent magnet 7, a weight-distributing plate 8 (a heavy weight 8'), a center shaft 9 and a right cover 3 as main components combined together.

The left cover 2 is provided with a plurality of small holes 21 around the outer circumferential edge and is provided with a bearing holder 22 and a coil holder 23 in the interior. The coil holder 23 is bored with a notch 24 for receiving the projection 51 of the annular coil 5.

The magnet holder 6 has an extending portion 61 with a central shaft hole 62 protruding outward from the center.

The weight-distributing plate 8 or the heavy weight 8' has a combining portion 81, 81' protruding leftward and a through hole 82, 82' in the center.

The right cover 3 is provided with a bearing holder 31 in the central interior.

Figure 4:
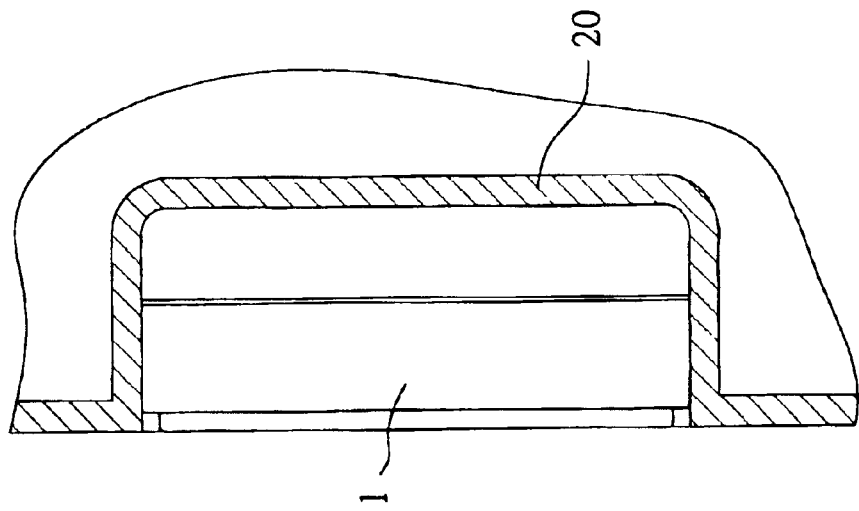
FIG. 4 is a side view of the automatic power-generating device for decorative lamps, assembled on a wheel rim cover in the present invention.
Figure 3:
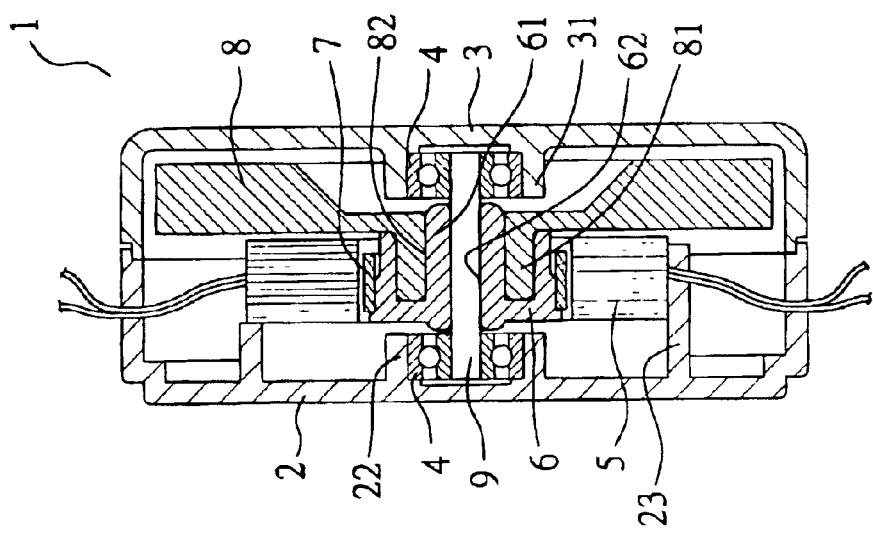
FIG. 3 is a side cross-sectional view of the automatic power-generating device for decorative lamps in the present invention.

In assembling, as shown in FIG. 3, firstly, the center shaft 9 is inserted in the central shaft hole 62 of die magnet holder 6, the permanent magnet 7 is fitted around the outer circumferential edge of the magnet holder 6, and the combining portion 81, 81' of the weight-distributing plate 8 or the heavy weight 8' is received in the accommodating space 63 of the magnet holder 6. Next, the annular coil 5 has its projection 51 engaged firmly with the notch 24 of the coil holder 23 within the left cover 2, and the electric wires connected with the annular coil 5 are respectively inserted out of the small holes 21 around the outer peripheral edge of the left cover 2 to be respectively connected with decorative lamps 10. Then, the left bearing 4 is positioned in the bearing holder 22, and the center shaft 9 has its left end fitted in the left bearing 4 and its right end fitted in the right bearing 4, which is then positioned in the bearing holder 31 within the right cover 3. At this time, the left and the right covers 2, 3, by means of high frequency welding, can be closed integral together, with its interior impossible to be invaded by dust or vapor and to be damaged or fall out. The automatic power-generating device 1, 1' in this invention is able to be employed independently, or mounted on or adhered to a wheel rim cover 20, as shown in FIG. 4, is capable of saving electricity and is convenient to be installed.

Figure 5:
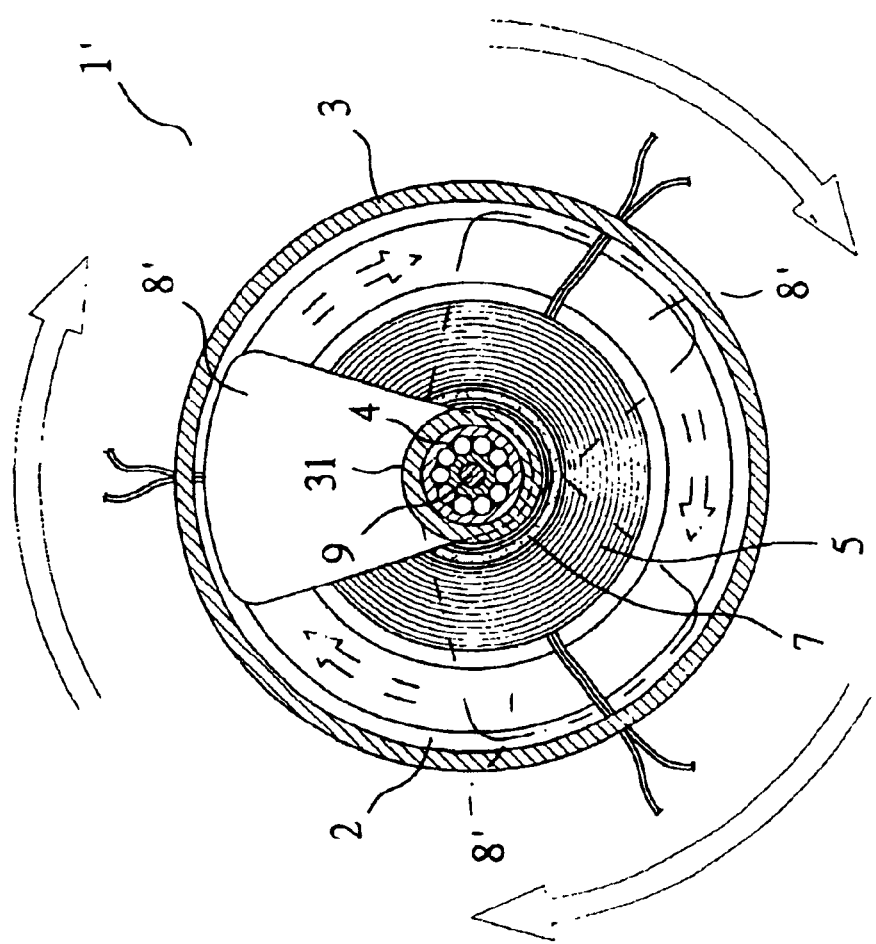
FIG. 5 is a front view of the second embodiment of the automatic power-generating device for decorative lamps in an operating condition in the present invention.

In using and operating, as shown in FIG. 5, when the automatic power-generating device 1, 1' is actuated to rotate by an exterior force, the weight distributing plate 8 or the heavy block 8' fitted around the center shaft 9 will be forced to rotate by means of an eccentric force (a centrifugal force). Simultaneously, the left and the right bearings 4 pivotally fitted around the center shaft 9 and respectively received in the bearing holders 22, 31 of the left and the right covers 2, 3 will interact to actuate the weight-distributing plate 8 or the heavy block 8' and the left and the right covers 2, 3 to rotate at different speeds. At this time, the annular coil 5 received in the interior of the left cover 2 and the permanent magnet 7 fitted around the center shaft 9 will rotate at different speeds due to the law of inertia to force magnetic field produced vicissitudes and to generate an inductive current (based on a principle of electromagnetic induction) to supply decorative lamps 10 with power for lighting through electric wires.

Figure 6:
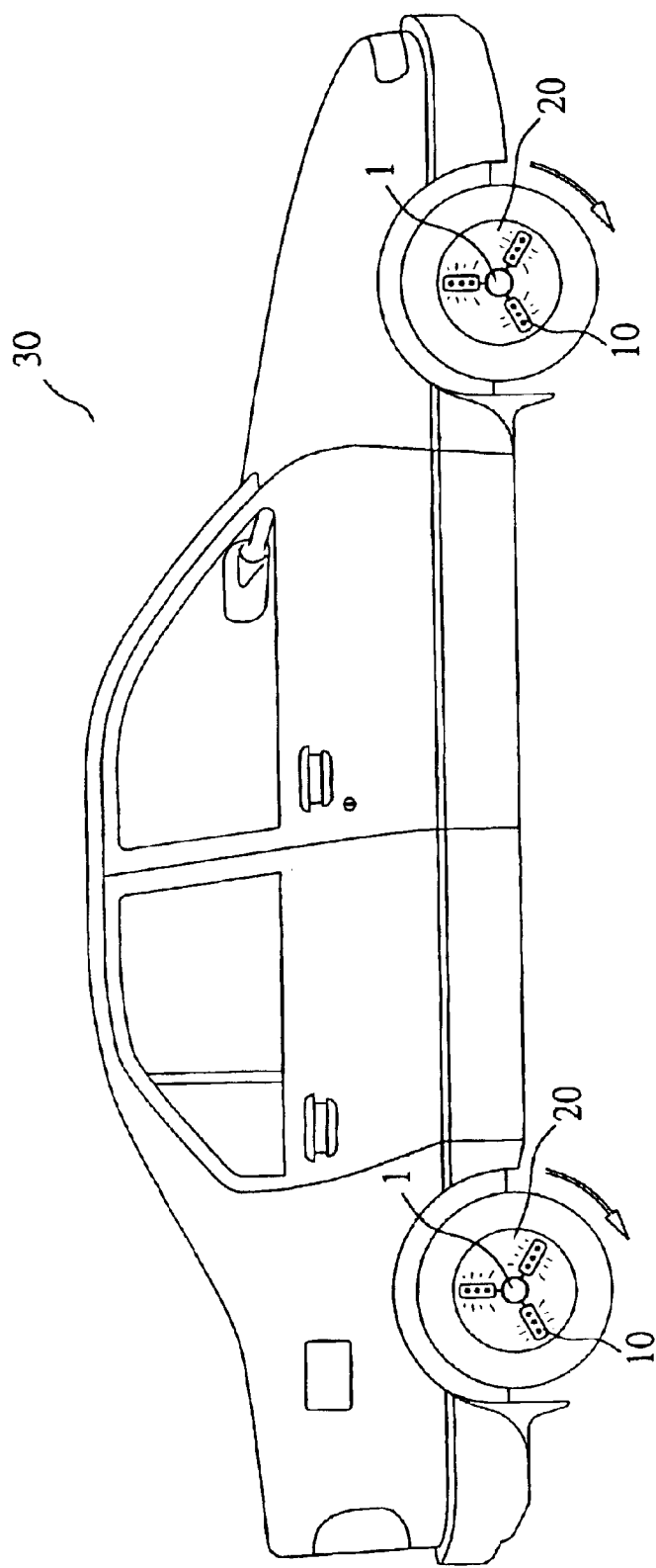
FIG. 6 is a front view of the automatic power-generating device for decorative lamps, assembled on the wheel rim cover of an automobile in the present invention.
Figure 8:
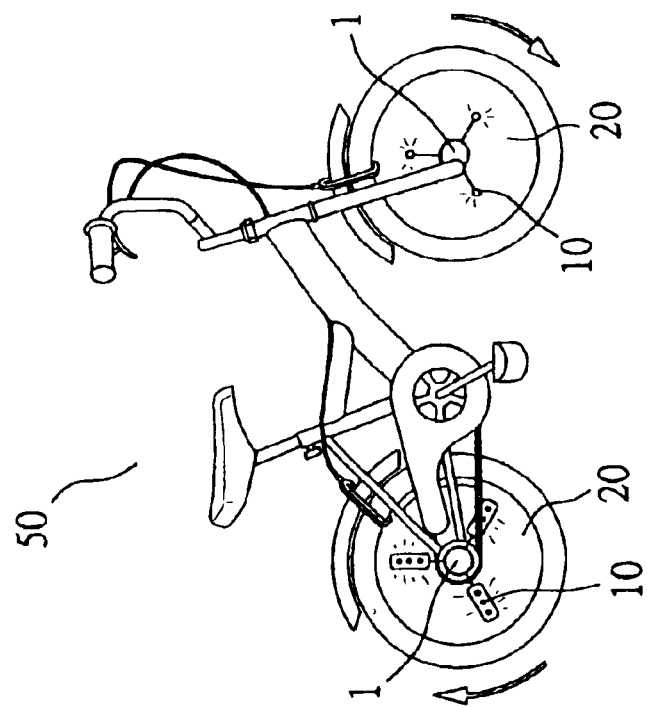
FIG. 8 is a front view of the automatic power-generating device for decorative lamps, assembled on the wheel rim cover of a bicycle in the present invention.
Figure 7:
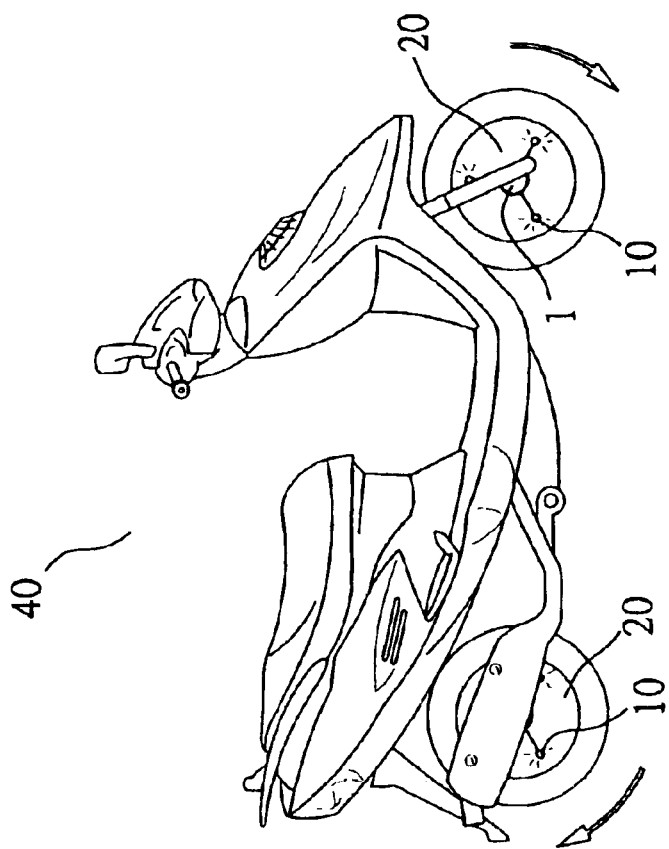
FIG. 7 is a front view of the automatic power-generating device for decorative lamps, assembled on the wheel rim cover of a motorcycle in the present invention.

The automatic power-generating device 1, 1' in the invention can be assembled on the wheel rim cover 20 of an automobile 30, a motorcycle 40 or a bicycle 50, as shown in FIGS. 6, 7 and 8. Thus, when the automobile 30 runs forward, the automatic power-generating device 1, 1' will rotate and generate electricity for lighting the decorative lamps 10 assembled on the wheel rim cover 20, acquiring an effect of a multi-colored decoration. Besides, this automatic power-generating device 1, 1' can also be installed on a rotatable toy, such as a flying disk or the like.

While the preferred embodiment of the invention has been described above, it will be recognized and understood that various modifications may be made therein and the appended claims are intended to cover all such modifications that may fall within the spirit and scope of the invention.

What is claimed is:

1. An automatic power-generating device for decorative lamps comprising, in combination:

a right cover;

a left cover, with the right and left covers being integrally connected to define a closed space;

a left bearing carried by the left cover inside of the closed space;

a right bearing carried by the right cover inside of the closed space;

a center shaft positioned between the left and right bearings and inside of the closed space; and a permanent magnet carried by one of the left cover and the center shaft, with the permanent magnet being inside the closed space;

an annular coil carried by the other of the left cover and the center shaft, with the annular coil being inside of the closed space; and electric wires connected to the annular coil and extending out of the closed space, with the electric wires adapted to be connected with decorative lamps, with the right and left covers preventing the introduction of dust and vapor into the closed space and to the center shaft, to the right and left bearings, to the annular coil and to the permanent magnet, with rotation of the connected left and right covers causing rotation of the annular coil and the permanent magnet at different speeds due to the law of inertia, with the different speeds of rotation between the annular coil and the permanent magnet generating an inductive current to supply power.

2. The automatic power-generating device for decorative lamps as claimed in claim 1 further comprising, in combination: a weight-distributing plate carried with the permanent magnet for rotation therewith, with the weight-distributing plate located inside of the closed space.

3. The automatic power-generating device for decorative lamps as claimed in claim 2 wherein said weight-distributing plate is a heavy weight.

4. The automatic power-generating device for decorative lamps as claimed in claim 2 further comprising, in combination: a magnet holder fitted around and rotationally fixed to the center shaft, with the permanent magnet mounted around an outer peripheral edge of the magnet holder, with the magnet holder located inside of the closed space.

5. The automatic power-generating device for decorative lamps as claimed in claim 4, with the magnet holder having a central portion including an axially extending accommodating space, with the weight distributing plate having an axially extending combining portion fitted within the axially extending accommodating space.

6. The automatic power-generating device for decorative lamps as claimed in claim 5 with the left cover including a left bearing holder for receiving the left bearing, with the right cover including a right bearing holder for receiving the right bearing, and with the left and right bearing holders located within the closed space.

7. The automatic power-generating device for decorative lamps as claimed in claim 6 with the left cover including a coil holder receiving the annular coil, with the coil holder located in the closed space, with the left cover including an outer circumferential edge, with a plurality of small holes bored around the outer circumferential edge, with the electric wires extending out of the plurality of small holes.

8. The automatic power-generating device for decorative lamps as claimed in claim 7 with the left cover including a left disc, with the left bearing holder, the coil holder and the outer circumferential edge being annular and extending axially from the left disc, with the coil holder located intermediate the left bearing holder and the outer circumferential edge.

9. The automatic power-generating device for decorative lamps as claimed of claim 8 with the right and left covers being integrally connected by high frequency welding.

10. The automatic power-generating device for decorative lamps as claimed in claim 4 wherein said weight-distributing plate is a heavy weight.

11. The automatic power-generating device for decorative lamps as claimed in claim 5 wherein said weight-distributing plate is a heavy weight.

12. The automatic power-generating device for decorative lamps as claimed in claim 1 with the left cover including a left bearing holder for receiving the left bearing, with the right cover including a right bearing holder for receiving the right bearing, and with the left and right bearing holders located within the closed space.

13. The automatic power-generating device for decorative lamps as claimed in claim 12 with the left cover including a coil holder receiving the annular coil, with the coil holder located in the closed space, with the left cover including an outer circumferential edge, with a plurality of small holes bored around the outer circumferential edge, with the electric wires extending out of the plurality of small holes.

14. The automatic power-generating device for decorative lamps as claimed in claim 13 with the left cover including a left disc, with the left bearing holder, the coil holder and the outer circumferential edge being annular and extending axially from the left disc, with the coil holder located intermediate the left bearing holder and the outer circumferential edge.

15. The automatic power-generating device for decorative lamps as claimed of claim 14 with the right and left covers being integrally connected by high frequency welding.

16. The automatic power-generating device for decorative lamps as claimed in claim 1 with the left cover including a coil holder receiving the annular coil, with the coil holder located in the closed space, with the left cover including an outer circumferential edge, with a plurality of small holes bored around the outer circumferential edge, with the electric wires extending out of the plurality of small holes.

17. The automatic power-generating device for decorative lamps as claimed in claim 16 with the left cover including a left disc, with the left bearing holder, the coil holder and the outer circumferential edge being annular and extending axially from the left disc, with the coil holder located intermediate the left bearing holder and the outer circumferential edge.

18. The automatic power-generating device for decorative lamps as claimed of claim 17 with the right and left covers being integrally connected by high frequency welding.

19. The automatic power-generating device for decorative lamps as claimed of claim 1 with the right and left covers being integrally connected by high frequency welding.

* * * * *